May 19, 1964 R. E. MEYER 3,134,070
UNITARY CONTROL DEVICE FOR DETECTING THE MINIMUM LEVELS OF
CONCENTRATION IN A MULTIPLICITY OF
CAUSTIC WASHING SOLUTIONS
Filed July 20, 1960 2 Sheets-Sheet 1

*INVENTOR.*
RONALD E. MEYER
BY Paul H. Johnson
ATTORNEY

INVENTOR.
RONALD E. MEYER
BY
ATTORNEY

United States Patent Office 3,134,070
Patented May 19, 1964

3,134,070
UNITARY CONTROL DEVICE FOR DETECTING THE MINIMUM LEVELS OF CONCENTRATION IN A MULTIPLICITY OF CAUSTIC WASHING SOLUTIONS
Ronald E. Meyer, Tulsa, Okla., assignor to Remwood Chemical Company, Tulsa, Okla., a corporation of Oklahoma
Filed July 20, 1960, Ser. No. 44,151
1 Claim. (Cl. 324—30)

This invention relates to a device for controlling the level of concentration of caustic solutions. More particularly the invention may be described as a device for automatically controlling the concentration of caustic soda in a multiplicity of caustic wash solutions.

This application is a continuation-in-part of an application entitled "Method of Controlling Caustic Concentration in Bottle Washing Machines" filed April 25, 1960, having Serial Number 24,586, and now abandoned.

In the previous application a method is shown for automatically and continuously controlling the level of concentration of caustic soda in wash solutions such as is in bottle washing machines including novel means of maintaining the level of concentration of caustic at a predetermined minimum in a multiplicity of containers.

In addition to the problem of controlling the level of caustic concentration in bottle washing machines a problem which faces operators of bottle washing machines is that of adding to the wash solutions efficiency improving chemicals, such as chelating agents, wetting agents, antifoam agents and detergents. At the present time such efficiency improving agents are manually dumped into the wash solutions. This procedure is, of course, time consuming and not dependable in that it is easy for a workman to forget when batches are to be added. This invention overcomes this problem permitting automatic adding of the various agents making up the complete bottle washing solutions along with the caustic soda so that no manual dumping of chemicals of any nature is required in bottle washing machines.

An additional difficulty which is encountered in using an automatic caustic level controlling method is the requirement of calibrating different solutions to function on a single detecting device. The use of a single detecting device is important in that it materially reduces the expense of installing automatic caustic controlling equipment. The use of the single detecting device, however to control the level of two or more containers requires that the probes used in the various containers be minutely adjusted so that the proper solution is maintained in each of the various vessels.

This invention may be described as a unitary control device for detecting minimum levels of concentration in each of a multiplicity of caustic wash solutions. More particularly, but not by way of limitation, the invention may be described as the combination with a multiplicity of separate caustic wash solution and a conductivity sensing probe immersed in each of the said wash solutions, a unitary control device for detecting minimum levels of concentration in each of the wash solutions, comprising, a conductivity actuated electrical control circuit, a relay means in said control circuit actuated by said control circuit to close upon detection by said control circuit of decreased conductivity a selector switch in communication with said control circuit and each of said conductivity detecting probes singly and selectively electrically connecting each of said conductivity sensing probes to said electrical control circuit to actuate said relay means of said circuit upon decreasing conductivity of the said wash solutions in which said sensing probes are immersed; and, a variable resistor in series with each of said sensing probes to very the level of conductivity at which said relay is actuated to close by said control circuit.

The basic object of this invention is to provide a single detecting instrument to control the level of caustic concentration in a multiplicity of solutions including means of calibrating the instrument independently for each solution.

Another object of this invention is to provide an improved probe device which will have a greatly increased useful life in caustic solutions compared to other probes now available.

Another object of this invention is to provide an improved probe for use in detecting the level of concentration of a caustic solution which will be simple, dependable, and exceedingly inexpensive to manufacture.

These and other objects and a better understanding of the invention may be had by referring to following description and claim taken in conjunction with the attached drawings in which:

Figure 1:
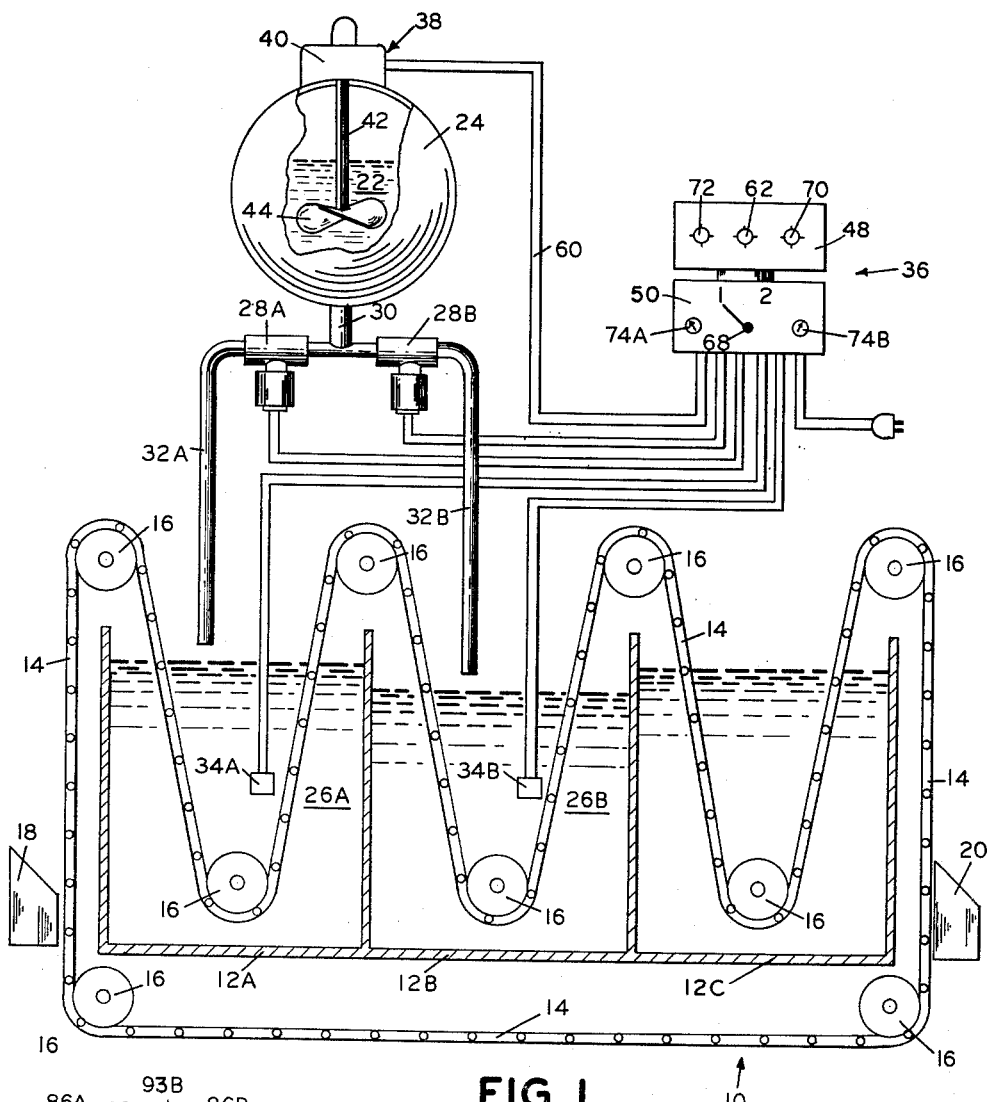
FIGURE 1 is a schematic diagram of a bottle washing machine showing the means whereby caustic soda is automatically added to maintain desired levels of concentration and whereby additives which are nonsoluble in liquid caustic are stirred in the caustic to form a homogeneous solution before the caustic mixture is added to the bottle washing machine solutions.

Referring now to the drawings and first to FIGURE 1, a typical bottle washing machine is shown, indicated generally by the numeral 10. Three separate tanks, indicated by the numerals 12A, 12B, and 12C, are shown making up the various solutions of the bottle washing machine 10. Some bottle washing machines may have only two tanks, 12A and 12B, or may have any number of individual tanks, more or less than is shown, depending upon the type of bottles being washed, the manufacturer's design, and the requirements of the bottle machine user. It is understood that the principles of this invention may be applied to bottle washing machines having any number of tanks 12. A conveying mechanism 14, which is supported by sprockets 16, conducts the bottles which are being washed through the various washing solutions. The bottles are placed on the conveying mechanism 14 at input point 18 and are taken off at output point 20.

For various reasons, such as manufacturer's requirements, or the requirement of local health authorities, different levels of concentrations of caustic is usually required in tank 12A than is required in tank 12B. The last solution through which the conveying mechanism 14 passes is rinse tank 12C, where the caustic wash solution is rinsed from the bottles prior to their reuse.

As caustic is depleted from wash solution 26A during the washing operation additional liquid caustic 22, stored in caustic reserve tank 24 is added when solenoid valve 28A opens. Liquid caustic 22 is conducted from caustic reserve tank 24 through pipe 30, solenoid valve 28A, and pipe 32A into caustic wash solution 26A. Likewise, when solenoid valve 28B is opened, liquid caustic 22 flows through pipe 30 and 32B to increase the level of concentration of caustic in wash solution 26B.

The levels of concentration of caustic in caustic wash solutions 26A and 26B are detected by probes 34A and 34B which actuate electronic circuits and actuate a control mechanism, indicated generally by the number 36, which will be described in greater detail subsequently.

Wash solutions 26A and 26B, commonly used in bottle washing machines, are primarily solutions of caustic soda and water wherein the level of concentration of caustic soda may vary from approximately two to fifteen percent, depending upon various conditions previously mentioned. There are, however, other ingredients which must be added to the wash solutions 26A and 26B so that effective washing of bottles will be attained. One such ingredient which is normally required in bottle washing machines is an anti-foaming agent; other examples being chelating agents, wetting agents, detergents, and so forth, which will be generally referred to as efficiency improving agents. At the present time such chemical agents are usually added manually by physically sumping small quantities into the caustic wash solutions. This is, of course, undesirable in that the manual application requires time of an operator which could be better devoted elsewhere. But the most difficult aspect of manually adding these efficiency improving agents is the problem of the operator forgetting to make the additions. Another difficulty in this presently used method of adding various agents to the caustic wash solutions is that the quantities of agents maintained in the wash solutions cannot be accurately controlled.

A most desirable means of adding the various chemicals which are required is to add them along with the liquid caustic solution 22. But a great difficulty arises in that most of the required chemical additives are not soluble in fifty percent liquid caustic. For instance, there are no commercially available anti-foaming agents today which are soluble in fifty percent liquid caustic, and fifty percent liquid caustic is the most common concentration of liquid caustic soda on the market today and is ideally suited for use with bottle washing machines. The most frequently used anti-foaming agents are the tricresylphosphates and silicones. Another type of additive which must be added to caustic wash solution is detergents, such as the complex phosphates, which are not soluble in fifty percent liquid caustic. Wetting agents, such as the alkylarylsulfonates and the nonylphenol ethylene oxide condensates are likewise not successfully soluble in fifty percent caustic.

Attempts to automatically add efficiency improving ingredients to caustic wash solutions of bottle washing machines along with the addition of liquid caustic has been unsuccessful since the ingredients, as above mentioned, are not soluble in the liquid caustic, and in addition, are usually of a lower specific gravity so that they will not remain in suspension in the liquid caustic. Liquid caustic is a relatively high specific gravity liquid (50% liquid caustic weighs about 13 pounds per gallon) so that most of the efficiency improving ingredients float on top of the liquid caustic 22 in tank 24 and will not drain into caustic wash solutions 26A and 26B when solenoid valves 28A and 28B are opened.

The addition of various agents to the washing solutions of bottle washing machines is made possible in this invention by providing a stirring mechanism 38 in conjunction with the caustic reserve tank 24.

Each of the various efficiency improving agents required in wash solutions 26A and 26B are deposited with liquid caustic 22 into caustic reserve tank 24 in proportion to their consumption during the washing process to be added with liquid caustic 22.

Figure 2:
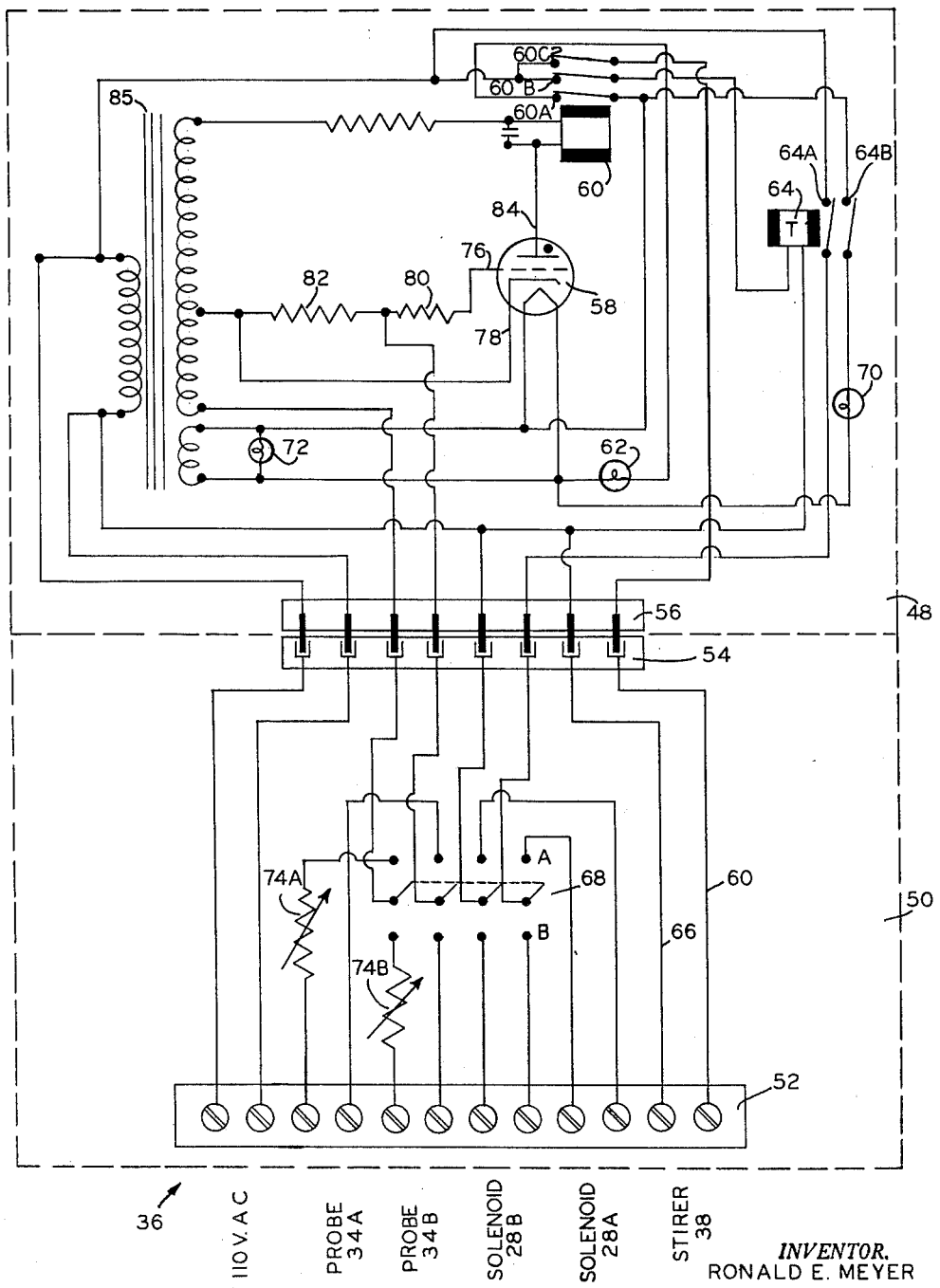
FIGURE 2 is a schematic diagram of the electrical circuit of this invention showing means whereby the level of concentration of caustic soda is detected and including means whereby calibration of the level of concentrations in a multiplicity of vessels may be maintained utilizing a single detecting system.

A small motor 40 is positioned on the caustic reserve tank 24 and has affixed to it a propeller shaft 42 extending down within the tank 24 to support a propeller 44. The propeller 44 is positioned near the bottom of caustic reserve tank 24 so as to be emersed in the liquid caustic 22 even when the tank is nearly empty. Stirring mechanism 38 is actuated preparatory to the introduction of liquid caustic 22 into tanks 12A or 12B so that as the liquid caustic flows out through pipe 30 it will have intermixed, such as to form a homogeneous solution, the various agents and additives required in the washing solutions 26A and 26B. The method of controlling stirring mechanism 38, in conjunction with the actuation of solenoid valves 28A and 28B to add liquid caustic and efficiency improving agents to washing solutions 26A and 26B, may be best understood by referring to FIGURE 2.

Control mechanism 36 is divided into two portions. The upper portion is the electronic detector portion 48 and the lower portion is the terminal portion 50. Terminal portion 50 is adapted to be securely mounted on a wall in the building containing the bottle washing machine 10. A terminal strip 52 provides means for connecting the terminal portion 50 with the various elements of the bottle washing machine shown in FIGURE 1. A female plug portion 54 is affixed to terminal portion 50 and is adapted to receive a male plug portion 56 affixed to electronic detector portion 48. In this way electronic detector portion 48 may be readily removed for repairs without the onerous problem of disconnecting the control mechanism 36 from each of the various components of the bottle washing machine 10.

Electronic detector portion 48 is adapted to detect changes in the conductivity of caustic wash solutions 26A and 26B and to actuate when the conductivity drops below a predetermined point. The conductivity of a caustic solution is proportional to the concentration of caustic in the solution, therefore, by determining the conductivity of the solution the level of concentration of caustic in the solution is determined. An electron tube 58 fires, or becomes conductive, when the level of concentration as detected by probes 34A or 34B decreases to a predetermined point. This causes increased current to flow through relay 60. Relay 60 has three circuit contacts, all of which close when the relay energizes. The first function upon the energization of relay 60, closing relay contact 60A, is to turn on "caustic required" light 62. Relay contact 60B, upon closure, applies energy to time delay relay 64, whose function will be described subsequently. Relay contact 60C, upon closure, provides voltage through conductors 77 to energize stirrer 38, starting the rotation of propeller 44 to stir into a homogeneous solution the liquid caustic 24 and additives in caustic reserve tank 24.

Time delay relay 64, upon receiving energy, does not close immediately but experiences a certain delay, of approximately two to five minutes, before closing its contacts 64A and 64B. When contact 64A closes, electrical energy is applied to solenoid 28A or 28B, depending upon the position of selector switch 68. This serves to open either solenoid 28A or 28B to add liquid caustic 22 to caustic wash solutions 26A or 26B. The liquid caustic 22 added will have intermixed with it in proportion all of the additives and agents found in caustic reserve tank 24. Relay contact point 64B, when closed, turns on "caustic being added" indicator light 70.

A "power on" indicator light 72 indicates at all times when the control mechanism 36 is in operating condition and available to detect insufficient levels of concentration in caustic wash solutions 26A and 26B.

The operation of the caustic concentration control mechanism of this invention is as follows. With selector switch 68 in position A, probe 34A and solenoid 28A are connected to the circuit of electronic detector portion 48. When the level of concentration of caustic solution 26A drops below the minimum required point, electron tube 58 conducts, closing switch contacts 60A, 60B and 60C of relay 60. This turns on "caustic required" light 62, applies energy to time delay relay 64, and starts stirrer 38. After approximately two to five minutes, depending upon the time delay of time delay relay 64 (it has been found by experience that at least two minutes should elapse), time delay relay 64 closes. This provides adequate time for the efficiency improving additives to thoroughly mix and become homogeneously dispersed in the liquid caustic 22. When time delay relay 64 closes, solenoid valve 28A is opened permitting caustic solution 22, with all of the additives and agents thoroughly mixed in their proportionate quantities, to flow into tank 12A. At the same time "caustic being added" indicator light 70 glows to indicate that caustic is at that time being added to the bottle washing machine 10. In like manner, when selector switch 68 is in position B, the mechanism functions to detect and control the level of concentration of caustic soda in tank 12B.

By the provision of a stirring mechanism 38 in conjunction with a time delay period before solenoid 28A is opened, all additives and agents can be simultaneously added to the caustic wash solutions 26A and 26B without the requirement that they be manually added, eliminating the continuous possibility that the manual additions will be overlooked by the operator. By the principles of this invention the addition of all chemicals to the wash solution is easily and automatically achieved.

The control mechanism 36 of this invention is adaptable so that a single electronic detector portion 48 may be utilized to control the levels of concentration in a multiplicity of caustic wash solutions 26A and 26B. One difficulty encountered is that of calibrating the circuit so that proper concentration will be maintained in each of the multiplicity of solutions. Even if the same level of concentration is required in both solutions 26A and 26B difficulty is nevertheless encountered in that the same conductivity across probes 34A and 34B is hard to maintain. Any change in the spacing between the probe elements contacting the liquids of the caustic wash solutions 26A and 26B changes the conductivity and attempting to manufacture two probes which will have exactly the same conductivity in the same solution is virtually impossible. Previous means of calibrating the conductivity of two systems so that a single electronic detector portion 48 could function to control two or both solutions required that the probes 34A and 34B be minutely adjusted. The distances between the probe elements can be changed to alter the conductivity detected by the probe and also the amount of conductor surface exposed on the probe could be changed. This method is unsatisfactory in that first, it is time consuming and does not lend itself to very fine and minute adjustments, and second, any change in the probes, such as incrustation or corrosion, required remanipulation of the probes to place the system back into calibration. An important element of this invention is a means whereby a single electronic detector portion 48 may be utilized to control the levels of concentration of a multiplicity of solutions, wherein the calibration for each solution can be easily and accurately achieved.

A first calibrating rheostat 74A is placed in series with probe 34A and a second calibrating rheostat 74B is placed in series with probe 34B. Electron tube 58 conducts when its grid element 76 becomes increasingly positive with respect to its cathode element 78. Resistors 80 and 82 are in a position between plate element 84 and cathode element 78. The circuit is so arranged that each time a positive voltage is placed on plate element 84, by transformer 85, a negative voltage is placed through calibrating rheostat 74A and probe 34A back to the juncture point between fixed resistors 80 and 82, thereby applying a negative voltage on grid element 76. As long as the negative pulse, which appears on grid element 76 each time a positive pulse appears on plate element 84, is of sufficient magnitude, electronic tube 58 will not conduct. As the total resistance of probe 34A plus calibrating rheostat 74A increases, less negative voltage is applied to grid element 76 and a point is reached where electron tube 58 conducts sufficiently to energize relay 60.

An example of one means of calibrating the control mechanism 36 is accomplished as follows: A caustic solution of known concentration, as for example five percent, is provided and probe 34A is immersed into it. With selector switch 68 in position A, the total resistance experienced by the probe 34A in the five percent test caustic solution will be added to the resistance of calibrating rheostat 74A. By gradually raising the resistance of calibrating rheostat 74A the point is reached at which electron tube 58 conducts sufficient current to close relay 60. With the calibrated rheostat 74A maintained at this selected resistance relay 60 will close each time the level of concentration of the caustic solution in which probe 34A is emersed becomes five percent or less.

Selective switch 68 can now be moved to B position and the same calibrating procedure repeated, wherein calibrating rheostat 74B is adjusted. It may be required that the level of concentration of caustic in the tank in which probe 34B is to be emersed is, for example, three percent. This can be accomplished merely by increasing the resistance of calibrating rheostat 34B to the point where relay 60 will close when emersed in a caustic solution having a known concentration of three percent. In this manner the level of concentration of caustic soda in a multitude of solutions may be detected by one electronic detector 48 wherein the solutions may be required to have the same or different levels of concentration and irrespective of the inherent divergent resistance characteristics of probes 34.

Figures 3, 4:
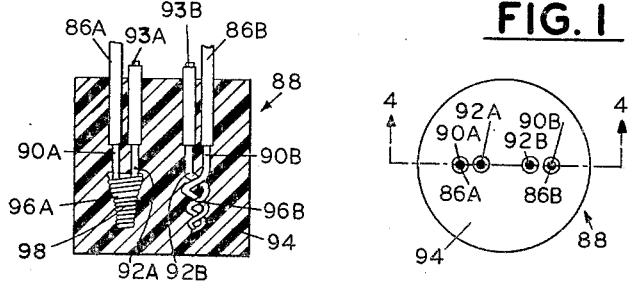
FIGURE 3 is a top view of a probe adaptable for detecting the level of caustic soda concentration.
FIGURE 4 is a cross sectional view taken along the line 4—4 of FIGURE 3 showing means of assembling the improved probe of this invention.

FIGURE 3 and FIGURE 4 disclose an improved probe for use in detecting the conductivity of caustic solutions. The most common types of electrical conductors in use today are composed essentially of copper or aluminum. Both of these metals are attacked by caustic solutions causing the formation of scales over the exposed metal surfaces. The scales which are formed have a much higher resistance to the flow of electricity than the aluminum or copper metals. The formation of such scales on probes made of copper or aluminum conductors materially changes the resistivity of the probe emersed in the caustic solution as reflected back to the electronic detector 48. This resistance change means calibration of the electronic detector 48 is difficult and that after the instrument has been calibrated to actuate when the level of concentration falls below a predetermined minimum gradual incrustation of the exposed metal components of the probe changes the point at which relay 60 energizes so that the instrument no longer performs accurately and satisfactorily.

Certain metals, such as stainless steel, Monel or even mild steel, are not attacked by caustic solutions of the strength usually required in bottle washing machines. However, these metals do not make satisfactory electrical conductors because they have a high resistance and are not flexible. Their inflexibility means that upon frequent bending they break and interrupt electrical continuity. A novel manner of using these metals in the inexpensive formation of an improved and effective probe is shown in FIGURES 3 and 4.

Conductors 86A and 86B which are, as an example commonly used and inexpensive, plastic covered copper conductors of the types typically used in residential and industrial wiring extend from the probe, indicated generally by numeral 88, to the control mechanism 36. Affixed to the exposed metallic conductor portion 90 of conductors 86 is a short piece of metallic wire 92A and 92B of a material not reactive with caustic solutions, which is secured to conductor portion 90. Non-reactive conductor portion 92 is a rather short length of wire extending a small distance back along the length of conductors 86A and 86B. End portions 93A and 93B of conductors 92A and 92B are exposed to contact the liquid caustic solution in which probe 88 is submersed. The metallic conductors 90 and 92 are secured together to form electrical continuity therebetween and the complete assembly is surrounded by a plastic body 94. One means of forming plastic body 94 is to place conductors 86A, 86B, 92A and 92B, which have been secured together at contact point 96A and 96B, into a form and filling the form with an epoxy resin. When the resin solidifies, a probe is formed wherein conductors 92A and 92B are supported a uniform distance apart and between conductors 86A and 86B. This arrangement prevents conductors 92A and 92B from coming in contact with metallic elements, such as the sides of the caustic tanks 12A and 12B.

Several means are available whereby electrical contact points 96A and 96B may be formed between conductors 86 and 92. One method is to simply twist the conductors 90A and 92A together and conductors 90B and 92B together. Another method, which is shown in FIGURE 4, consists in placing the conductors 90 and 92 together and securing around the contiguous conductors an electrical contacting device 98, commonly referred to as a "wire nut." Conductors 90 and 92 may, of course, also be joined by soldering, although the two previous methods of joining the conductors to form contact points 96 is less time consuming.

Contact points 96A and 96B may be wrapped with electrical insulating tape or protected by other insulating mediums before the plastic body 94 is formed around the contact points 96A and 96B. If an epoxy resin, as previously suggested, is used, since it is possessive of a high insulating characteristic, no insulation around contact points 96A and 96B is required.

Some of the advantages of the probe disclosed in FIGURES 3 and 4 may not be readily apparent. The construction as described permits the use of a rather inexpensive and flexible conductor 86A and 86B leading from the probe 88 to control mechanism 36. At the same time this construction requires only short, therefore inexpensive, portions of the more expensive and less flexible types of conductors 92A and 92B such as Monel, mild steel or stainless steel, which are not attacked by caustic soda solutions. The provision of a probe 88 having exposed metal conductors 92A and 92B which will not corrode in the presence of caustic solutions means that frequent cleaning of the probes is eliminated and that less frequent recalibration of the control mechanism 36 is required. The probe 88 is very inexpensive to manufacture, and as assembled, is exceedingly sturdy.

The improvements in methods of automatically detecting and maintaining minimum caustic soda concentrations in bottle washing machines herein described make possible the automatic adding to wash solutions required amounts of caustic soda and efficiency improving ingredients without manual effort and in a manner permitting easier calibration of divergent requirements of levels of concentration.

Although this invention has been described with a certain degree of particularity it is manifest that many changes be made in the details of construction and the arrangement of components without departing from the spirit and the scope of this disclosure.

I claim:

In combination with a multiplicity of separate caustic wash solutions and a conductivity sensing probe immersed in each of the said wash solutions, a unitary control device for detecting minimum levels of concentration in each of the wash solutions, comprising:
 a conductivity actuated electrical control circuit;
 a relay means in said control circuit actuated by said control circuit to close upon detection by said control circuit of decreased conductivity;
 a selector switch in communication with said control circuit and each of said conductivity detecting probes singly and selectively electrically connecting each of said conductivity sensing probes to said electrical control circuit to actuate said relay means of said circuit upon decreasing conductivity of the said wash solutions in which said sensing probes are immersed; and,
 a variable resistor in series with each of said sensing probes to vary the level of conductivity at which said relay is actuated to close by said control circuit.

References Cited in the file of this patent
UNITED STATES PATENTS

| | | |
|---|---|---|
| 1,388,613 | Simsohn | Aug. 23, 1921 |
| 1,994,762 | Ennis | Mar. 19, 1935 |
| 2,505,936 | Behn | May 2, 1950 |
| 2,525,754 | Albrecht | Oct. 17, 1950 |
| 2,528,889 | Kohl | Nov. 7, 1950 |
| 2,565,501 | Ingram | Aug. 28, 1951 |
| 2,651,751 | Heath | Sept. 8, 1953 |
| 2,687,139 | Noble | Aug. 24, 1954 |
| 2,888,640 | Eckfeldt et al. | May 26, 1959 |
| 2,928,406 | Cunniff et al. | Mar. 15, 1960 |
| 2,985,827 | Hasenkamp | May 23, 1961 |